United States Patent [19]

Fitzgerald et al.

[11] Patent Number: 4,751,580
[45] Date of Patent: Jun. 14, 1988

[54] TELEVISION RECEIVER STANDBY POWER SUPPLY

[75] Inventors: Wiliam V. Fitzgerald, Indianapolis; Alan A. Hoover, New Palestine, both of Ind.

[73] Assignee: RCA Licensing Corporation, Princeton, N.J.

[21] Appl. No.: 811,119

[22] Filed: Dec. 19, 1985

[51] Int. Cl.$^4$ .............................................. H04N 3/18
[52] U.S. Cl. ..................................... 358/190; 307/64
[58] Field of Search ............... 358/190, 194.1; 307/64, 307/66; 455/343

[56] References Cited

U.S. PATENT DOCUMENTS

| | | | |
|---|---|---|---|
| 4,115,704 | 9/1978 | Hannemann et al. | 307/64 |
| 4,468,571 | 8/1984 | Heavey et al. | 307/66 |
| 4,500,923 | 2/1985 | Duvall et al. | 358/190 |

FOREIGN PATENT DOCUMENTS

| | | | |
|---|---|---|---|
| 0117929 | 10/1978 | Japan | 358/190 |
| 0013558 | 1/1980 | Japan | 358/190 |
| 0175367 | 10/1983 | Japan | 358/190 |
| 0207772 | 12/1983 | Japan | 358/190 |

OTHER PUBLICATIONS

A Hitachi CPT 2588, CPT 2888 Color Television Service Information Manual, Including a Schematic of the H-5 Chassis.

RCA Color Television Basic Service Data CTC 133 Series, published by RCA Corporation, Consumer Electrics, Indianapolis, In., dated 1985.

Primary Examiner—Howard W. Britton
Assistant Examiner—Victor R. Kostak
Attorney, Agent, or Firm—Eugene M. Whitacre; Paul J. Rasmussen; Joseph J. Laks

[57] ABSTRACT

In a standby power supply for a television receiver, a rectifier arrangement, electrically nonisolated from a source of AC mains supply voltage, develops a first, nonisolated direct voltage that is present during both the on-state and the standby state of an on-off command signal generated by a remote control circuit. The primary winding of a standby transformer is coupled to the rectifier arrangement and to the AC voltage source for developing a second, nonisolated direct voltage of lower magnitude than the first direct voltage. The control circuit of a switched mode power supply is energized by the second direct voltage and is responsive to the on-off command signal for changing operation of the switched mode power supply between a standby mode and a run-mode. An electrically isolated secondary winding of the standby transformer develops a third direct voltage for energizing the remote control circuit during standby.

16 Claims, 1 Drawing Sheet

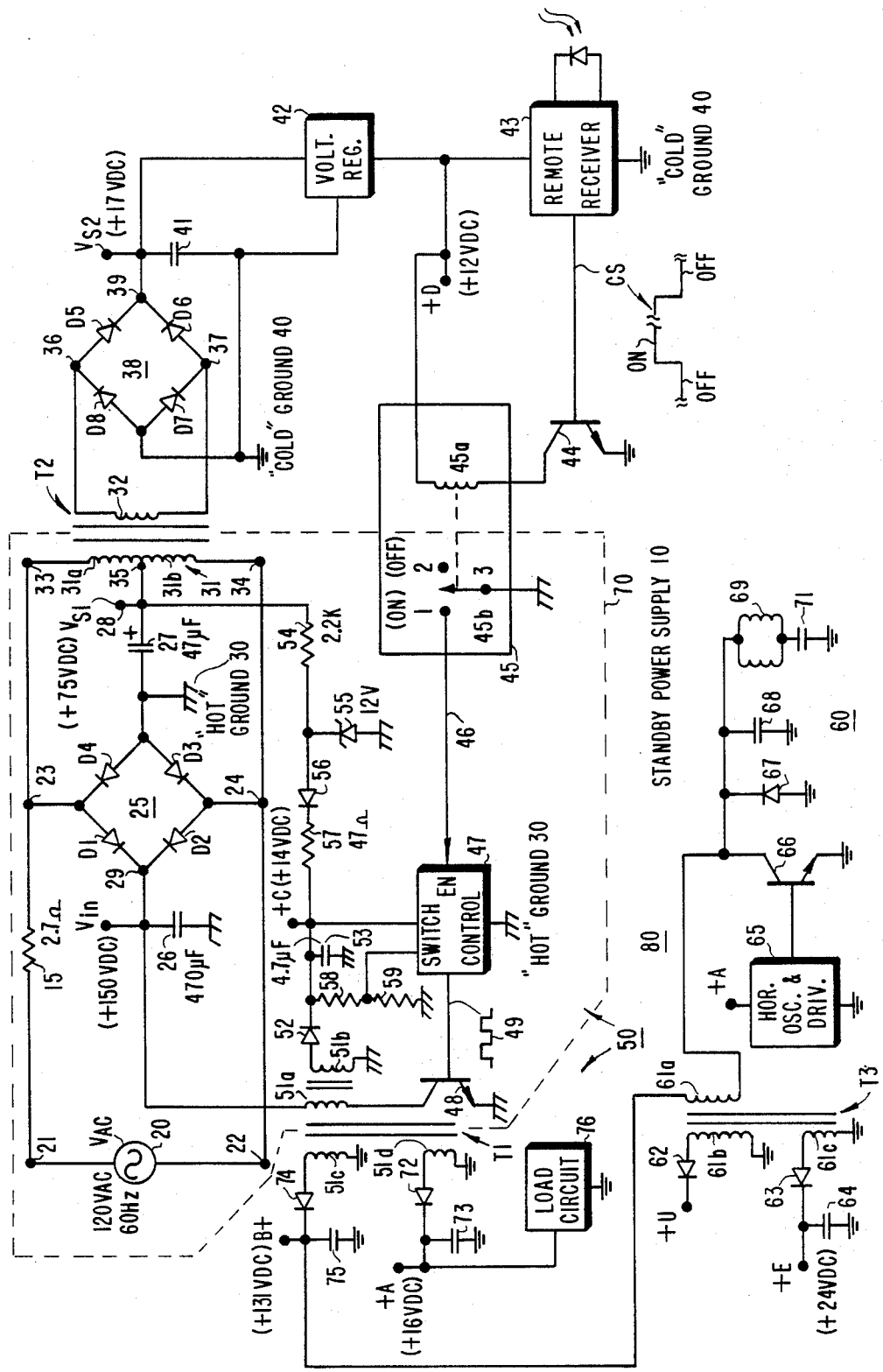

TELEVISION RECEIVER STANDBY POWER SUPPLY

This invention relates to a standby power supply responsive to an on-off command signal.

In a remote controlled television receiver, for example, a remote control circuit generates an on-off command signal to switch operation of the television receiver between the run-mode and the standby mode. In the run-mode, operating potentials for various television receiver circuits such as the signal circuits and the ultor high voltage circuit, are developed, illustratively, from a switched mode power supply or from the horizontal output transformer of a horizontal deflection circuit.

To place the television receiver in the standby mode, the power supplies are disabled by a remote control circuit. The remote control circuit receives an infrared or ultrasonic transmission and generates an on-off command signal that disables the control circuitry of the power supplies.

During standby, operating potentials must be developed for the remote control circuit to enable the circuit to respond to the infrared or ultrasonic transmission, and for the power supply control circuitry to enable the circuitry to respond to the turn-on command signal generated by the remote control circuit.

The standby operating potentials may be derived from the AC mains voltage. To minimize the electrical shock hazard, it may be desirable to electrically isolate the remote control circuit of the television receiver from the AC mains voltage source. For AC mains isolation purposes, an isolation transformer may be used, where the primary winding of the transformer is coupled to the AC mains voltage source and is electrically nonisolated therefrom, but where the secondary winding is maintained electrically isolated. Electrical isolation may be defined as the presence of an impedance between a user accessible point and the AC mains source of such magnitude that the maximum current that can flow between that point and the AC mains source is below a specified, very small level, such as 500 microampere.

An electrical isolation barrier to the AC mains source may also be provided by the power transformer of the switched mode power supply, with the primary winding and power switch being electrically nonisolated from the AC mains source and various ones of the secondary windings that provide operating potential to electrically isolated load circuits of the television receiver being electrically isolated. Since the power switch is electrically nonisolated, it may be desirable to also maintain the switched mode control circuit electrically nonisolated, thereby avoiding the need for an additional isolation barrier within the switched mode control circuit.

The standby operating potential for the switched mode control circuit is typically of a much lower magnitude than that of the rectified AC mains voltage. A desirable feature of the standby power supply is to generate a nonisolated operating potential for the switched mode control circuit in a way that dissipates relatively little power during standby operation.

In accordance with an aspect of invention, a rectifier arrangement is coupled to the AC voltage source and electrically nonisolated therefrom for developing a first direct voltage that is electrically nonisolated and that is present during both the on-state and the standby state of an on-off command signal. A first winding of a standby transformer is coupled to the AC voltage source and electrically nonisolated therefrom for developing a second electrically nonisolated direct voltage of lower magnitude than the first direct voltage. A second winding of the transformer is electrically isolated from the source for developing a third electrically isolated direct voltage. A control circuit electrically isolated from the source and energized, by the third direct voltage, at least during the standby state, generates the command signal. An electrically nonisolated load circuit is energized by the second direct voltage and is responsive to the command signal for changing modes of operation between a standby mode and a run-mode in accordance with the state of the command signal.

The sole FIGURE illustrates a standby power supply for a television receiver, embodying the invention.

In the standby power supply 10 for a television receiver, illustrated in the FIGURE, an AC mains voltage $V_{AC}$, is developed between AC voltage terminals 21 and 22 by an AC mains source 20. Terminals 21 and 22 are respectively coupled to input terminals 23 and 24 of a full-wave bridge rectifier 25, comprising diodes D1–D4. A current limiting resistor 15 is coupled between terminals 21 and 23.

The AC voltage $V_{AC}$ is rectified by bridge rectifier 25 to develop a DC voltage $V_{in}$ between an output terminal 29 of rectifier 25 and a current return terminal 30. A filter capacitor 26 is coupled between the two terminals.

Current return terminal 30 represents the ground reference terminal for load circuits conductively connected to that terminal. Since ground terminal 30 is electrically nonisolated from AC mains voltage source 20, the ground symbol for terminal 30 is designated as a "hot" ground.

The mains derived DC voltage $V_{in}$ provides power to a switched mode power supply 50. Bridge rectifier output terminal 29 is coupled to the primary winding 51a of a switching power transformer T1. A power switch 48 is coupled to primary winding 51a and to a switch control circuit 47. Switch control circuit 47 generates a switching signal 49 that controls the on-off switching of power switch 48 to generate AC voltages across the secondary windings 51b,c,d of power transformer T1.

During the run-mode, steady-state, operation of power supply 10, switched mode power supply 50 generates DC operating voltages +A, B+ and +C. The AC voltage developed across winding 51d is rectified by a diode 72 and filtered by a capacitor 73 to develop the +A voltage. The AC voltage developed across winding 51c is rectified by a diode 74 and filtered by a capacitor 75 to develop the B+ voltage. The AC voltage developed across winding 51b is rectified by a diode 52 and filtered by capacitor 53 to develop the +C voltage. The +C voltage is fed back to switch control circuit 47 via a resistor 58 of voltage dividing resistors 58 and 59 to regulate the DC voltages provided by switched mode power supply 50.

The B+ voltage is applied to the primary winding 61a of a flyback transformer T3 to energize a horizontal deflection circuit 60 of the television receiver. Horizontal deflection circuit 60 comprises a horizontal oscillator and driver circuit 65, a horizontal output transistor 66, a damper diode 67, a retrace capacitor 68 and the series arrangement of a horizontal deflection winding 69 and an S-shaping capacitor 71.

The +A voltage developed by switched mode power supply 50 energizes horizontal oscillator and driver circuit 65, as well as other loads circuits, collectively illustrated in the FIGURE as load circuits 76.

Horizontal deflection circuit 60 and flyback transformer T3 form a second switched mode power supply 80 that is enabled only during run-mode operation of the television receiver. The AC voltage across a secondary winding 61c of flyback transformer T3 is rectified by a diode 63 and filtered by capacitor 64 to develop a +E DC voltage that energizes such television receiver load circuits as the vertical deflection circuit. The AC voltage across a high voltage winding 61d of flyback transformer T3 is rectified by a diode 62 to develop an ultor accelerating potential +U for the picture tube of the television receiver, not illustrated in the FIGURE.

On-off operation of the television receiver is accomplished by remote control as is evidenced in the FIGURE by the absence of a manually operated mechanical on-off switch interposed between AC mains voltage source 20 and bridge rectifier 25. The television receiver is turned off by disabling switched mode power supply 50. This in turn disables switched mode power supply 80 by removing the operating potentials for power supply 80.

To switch between the standby mode and the run-mode of operation, the television receiver includes a remote receiver control circuit 43 that is responsive to an infrared or ultrasonic signal transmission. Remote control circuit 43 decodes the transmitted signal and generates an on-off command signal CS that assumes either the on-state when it is desired to turn the television receiver on, or the standby or off-state when it is desired to turn the television receiver off.

To turn the television receiver on, the on-state of command signal CS turns on a transistor 44 to apply a +D DC supply voltage across the relay coil 45a of an electro-mechanical relay 45. When relay coil 45a is energized, the arm of the mechanical switch 45b of relay 45 is moved to make contact with terminal 1 of the switch. The pole terminal 3 of switch 45b is grounded to hot ground 30.

A signal line 46 is coupled between contact terminal 1 of relay 45 and an enable terminal EN of switch control circuit 47. In a conventional manner, when enable terminal EN is grounded by signal line 46, switch control circuit 47 begins operation to generate switching signal 49 and power up switched mode power supply 50, which in turns powers up switched mode power supply 80.

To turn the television receiver off, the off-state or standby state of command signal CS is generated to cutoff transistor 44 and deenergize relay coil 45a. The arm of mechanical switch 45b is moved to relay contact terminal 2, removing ground potential from enable terminal EN. Switch control circuit 47 becomes disabled to power down switched mode power supplies 50 and 80.

During standby, the operating potentials provided by switched mode power supplies 50 and 80 are absent, yet both remote receiver control circuit 43 and switch control circuit 47 must remain energized. To energize these two circuits, the AC mains voltage source, a voltage source that is available during standby, generates the +C and +D operating potentials.

To minimize the risk of electrical shock, remote receiver control circuit 43 is electrically isolated from AC mains voltage source 20. By ground referencing the circuit to a mains isolated or "cold" ground 40, the need for isolation barriers within remote receiver control circuit 43 is eliminated.

Switch control circuit 47, however, is an electrically nonisolated load circuit which does not require electrical isolation from AC mains source 20 and may therefore be referenced to hot ground 30. The +C operating potential that energizes switch control circuit 47 both during run-mode and standby mode of operation, may be generated by circuitry that is electrically nonisolated from AC mains source 20.

In accordance with an inventive feature, standby power supply 10 includes an isolation transformer T2 having a secondary side that is isolated from AC mains voltage source 20 for developing the +D isolated standby supply voltage, while the primary side of standby transformer T2, the nonisolated side, generates the nonisolated, +C standby supply voltage for switch control circuit 47. End terminals 33 and 34 of primary winding 31 of standby transformer T2 are coupled to respective AC terminals 21 and 22 of mains voltage source 20. Voltage $V_{AC}$, that is applied across primary winding 31, is stepped down by secondary winding 32 and applied across input terminals 36 and 37 of a full-wave bridge rectifier 38, comprising diodes D5–D8.

Bridge rectifier 38 rectifies the stepped down AC voltage to develop a DC standby supply voltage $V_{S2}$ between an output terminal 39 and a current return terminal of the bridge rectifier that is coupled to the isolated or cold ground 40. A capacitor 41 provides filtering of the DC voltage. Voltage $V_{S2}$ is applied to a voltage regulator 42 for generating and regulating the +D standby supply voltage that energizes remote receiver control circuit 43, both during the standby and the run-mode of television receiver operation.

The energizing voltage generated by switched mode power supply 50 for switch control circuit 47 during the run-mode is unavailable during the standby mode. In accordance with a feature of the invention, the +C voltage during standby is derived from the AC mains voltage, $V_{AC}$. However, since the +C voltage is substantially lower in magnitude than the magnitude of rectified voltage $V_{AC}$, isolation transformer T2 is advantageously used to step down the AC voltage without producing excessive power dissipation.

A center tap terminal 35 divides primary winding 31 into two equal primary winding sections 31a and 31b. The AC voltage developed across each of the primary winding sections is therefore one-half the magnitude of voltage $V_{AC}$. A filter capacitor 27 is coupled between tap terminal 35 and hot ground 30 of bridge rectifier 25. This connection enables bridge rectifier 25 to alternately half-wave rectify the AC voltage across primary winding sections 31a and 31b and generate a DC standby supply voltage $V_{S1}$ at a terminal 28 connected to the positive plate of filter capacitor 27.

When voltage $V_{AC}$ is positive at terminal 21 relative to terminal 22, tap terminal 35 is positive relative to end terminal 34 of standby transformer T2. Diodes D1 and D3 conduct to charge main filter capacitor 26 and generate DC supply voltage $V_{in}$. The conduction of diode D3 results in the rectification of the AC voltage across primary winding section 31b to charge filter capacitor 37 and generate voltage $V_{S1}$.

When voltage $V_{AC}$ is positive at terminal 22 relative to terminal 21, terminal 35 is positive relative to end terminal 33. Diodes D2 and D4 conduct to charge filter capacitor 26 and generate voltage $V_{in}$. The conduction of diode D4 results in the rectification of the AC voltage across primary winding section 31a to charge filter capacitor 27 and generate voltage $V_{S1}$.

The magnitudes of the AC voltages across primary winding sections 31a and 31b are half that of AC voltage $V_{AC}$. Thus, the magnitude of voltage $V_{S1}$ is approximately half that of supply voltage $V_{in}$.

To generate the +C supply voltage during standby from voltage $V_{S1}$, a zener diode 55 is coupled to terminal 28 via a resistor 54. The junction of zener diode 55 and resistor 54 is coupled to the +C supply terminal via a diode 56 and a small-valued resistor 57. Thus, with the aid of primary winding 31 of isolation transformer T2, a nonisolated supply voltage is developed at the +C supply terminal during standby from a voltage $V_{S1}$ that is of relatively low magnitude.

Because voltage $V_{S1}$ is approximately half that of voltage $V_{in}$, the voltage drop that exists across resistor 54 is smaller than the voltage drop that would have existed had resistor 54 been directly connected to output terminal 29 of bridge rectifier 25. A significantly lower wattage rated dropping resistor may be used. During steady state operation, when switched mode power supply 50 is running, the rectified voltage provided by winding 51b of switching transformer T1 reverse biases diode 56 and avoids additional current drain on the +C supply through resistor 57.

Standby power supply 10 advantageously provides both isolated and nonisolated standby supply voltages in a manner that requires relatively few isolation barriers between the hot and cold referenced components of the television receiver. As illustrated in the FIGURE, the hot-ground referenced components are shown enclosed within dashed-line area 70 and are relatively few in number. Futhermore, standby transformer T2 is advantageously used to generate, in a relatively nondissipative manner, a nonisolated supply voltage that provides the +C operating potential for switch control circuit 47 during standby.

What is claimed:

1. A standby power supply for load circuitry responsive to a command signal having an on-state and a standby state, comprising:
   a source of AC voltage;
   a rectifier arrangement coupled to said source and electrically nonisolated therefrom for developing a first direct voltage that is electrically nonisolated and that is present during both the on-state and the standby state of said command signal;
   a standby transformer;
   means including a first winding of said transformer coupled to said source and electrically nonisolated therefrom for developing a second, electrically nonisolated, direct voltage of lower magnitude than said first direct voltage that is present during both the on-state and the standby state of said command signal;
   means including a second winding of said transformer electrically isolated from said source for developing a third electrically isolated, direct voltage that is present during both the on-state and the standby state of said command signal;
   a control circuit electrically isolated from said source and energized by said third direct voltage at least during the standby state for generating said command signal; and
   a load circuit electrically nonisolated from said source and energized by said second direct voltage at least during the standby state and responsive to said command signal for changing modes of operation between a standby mode and a run-mode in accordance with the state of said command signal.

2. A power supply according to claim 1 wherein said AC voltage is developed across said first winding and wherein said second direct voltage developing means comprises a capacitance coupled to a tap terminal of said first winding and to a nonisolated current return terminal of said rectifier arrangement.

3. A power supply according to claim 2 wherein said rectifier arrangement comprises a full-wave bridge rectifier having said AC voltage applied between two input terminals thereof and having said first direct voltage developed between an output terminal of said bridge rectifier and said nonisolated current return terminal.

4. A power supply according to claim 3 wherein said third direct voltage developing means includes a second rectifier arrangement coupled to said second winding for developing said third direct voltage between an output terminal of said second rectifier arrangement and a current return terminal isolated from said AC voltage source.

5. A power supply according to claim 4 including a switched mode power supply comprising controllable switch electrically nonisolated from said source and a power transformer having a primary winding electrically nonisolated from said source and coupled to said switch and to said first direct voltage and having a secondary winding electrically isolated from said source for developing only during the on-state of said command signal a fourth direct voltage electrically isolated from said source, and wherein said electrically nonisolated load circuit comprises a switch control circuit for generating a drive signal that is applied to said controllable switch upon receipt of the on-state of said command signal.

6. A power supply according to claim 5 including a second switched mode power supply energized by said fourth direct voltage for developing a fifth direct voltage only during the on-state of said command signal.

7. A power supply according to claim 6 wherein said second switched mode power supply comprises a horizontal deflection circuit and a flyback transformer.

8. A power supply according to claim 2 including a switched mode power supply comprising controllable switch electrically nonisolated from said source and a power transformer having a primary winding electrically nonisolated from said source and coupled to said switch and to said first direct voltage and having a secondary winding electrically isolated from said source for developing only during the on-state of said command signal a fourth direct voltage electrically isolated from said source, and wherein said electrically nonisolated load circuit comprises a switch control circuit for generating a drive signal that is applied to said controllable switch upon receipt of the on-state of said command signal.

9. A power supply according to claim 8 including a second switched mode power supply energized by said fourth direct voltage for developing a fifth direct voltage only during the on-state of said command signal.

10. A power supply according to claim 9 wherein said second switched mode power supply comprises a horizontal deflection circuit and a flyback transformer.

11. A switched-mode power supply for a television apparatus responsive to a command signal having an on-state and a standby state, comprising:
   a source of AC voltage;
   a rectifier arrangement coupled to said source for developing a main supply voltage and a first standby supply voltage during the standby state of said command signal, said main supply voltage and said first standby supply voltage being electrically nonisolated from said source;
   a standby transformer having a primary winding coupled to said source and electrically nonisolated therefrom and having a secondary winding electrically isolated therefrom for developing a second standby supply voltage during the standby state of said command signal, said second standby supply voltage being electrically isolated from said source;
   a command signal generator electrically isolated from said source and energized by said second standby supply voltage for generating said command signal;
   a controllable switch electrically nonisolated from said source;
   a power transformer having a primary winding electrically nonisolated from said source and coupled to said switch and to said main supply voltage and having a secondary winding electrically isolated from said source and coupled to a load circuit within said television apparatus requiring electrical isolation from said source; and
   a switch control circuit electrically nonisolated from said source and energized by said first standby supply voltage and responsive to said command signal for generating a drive signal that is applied to said controllable switch upon receipt of the on-state of said command signal to energize said load circuit during the on-state.

12. A power supply according to claim 11 wherein said load circuit comprises a horizontal deflection circuit coupled to a primary winding of a flyback transformer and an ultor terminal coupled to a high voltage winding of said flyback transformer for generating an ultor accelerating potential only during the on-state of said command signal.

13. A power supply according to claim 12 including a capacitance coupled to a tap terminal of said primary winding and to a nonisolated current return terminal of said rectifier arrangement and being charged via said tap terminal and rectifier arrangement for developing said first standby supply voltage.

14. A power supply according to claim 13 wherein said rectifier arrangement comprises a full-wave bridge rectifier having said AC voltage applied across two input terminals thereof and having said main supply voltage developed between an output terminal of said bridge rectifier and said nonisolated current return terminal.

15. A power supply according to claim 14 including a second, full-wave bridge rectifier having first and second input terminals coupled to respective first and second terminals of said secondary winding of said standby transformer and having said second standby supply voltage developed between an output terminal of said second bridge rectifier and a current return terminal isolated from said source of AC voltage.

16. Power supply apparatus, comprising:
   first and second AC voltage terminals having developed therebetween an AC voltage from a mains voltage source;
   a bridge rectifier having respective first and second input terminals coupled to the first and second AC voltage terminals for developing a first nonisolated DC voltage between an output terminal and a mains nonisolated current return terminal of said bridge rectifier;
   an isolation transformer including a mains nonisolated primary winding having first and second terminals coupled to the respective first and second input terminals of said bridge rectifier and including a mains isolated secondary winding;
   a filter capacitor coupled between a tap terminal of said primary winding and said nonisolated current return terminal for developing a second nonisolated DC voltage of lower magnitude than said first DC voltage;
   a second rectifier coupled to said secondary winding and to a current return terminal that is isolated from said mains voltage source for developing a third, mains isolated, DC voltage between an output terminal of said second rectifier and said isolated current return terminal;
   a command signal generator electrically isolated from said mains voltage source and energized by said third DC voltage for generating a command signal having an on-state and a standby state; and
   a load circuit electrically nonisolated from said mains voltage source and energized by said second voltage and responsive to said command signal for changing modes of operation between a standby mode and a run-mode in accordance with the state of said command signal.

* * * * *